INVENTOR
HANS KUHN 3,555,874
TOOL ARRANGEMENT FOR THE PRODUCTION OF IMPACT EXTRUDED ARTICLES
Hans Kuhn, Basel, Switzerland, assignor to
F. B. Hatebur A.G.
Filed Mar. 28, 1968, Ser. No. 716,798
Claims priority, application Netherlands, Mar. 29, 1967, 6704471
Int. Cl. B21c *35/00*
U.S. Cl. 72—257
4 Claims

ABSTRACT OF THE DISCLOSURE

The specification provides a punch and die for the impact extrusion of articles of partly reduced cross-section in which both the punch and die are provided with axially aligned bores in which ejectors can reciprocate. The ejectors are initially retracted from the facing surfaces of the punch and die so that cavities are formed in each, the slug being inserted in the larger cross-section of these two cavities. After deformation of the slug the two ejectors operate to release the finished article.

---

The present invention relates to a tool arrangement for the production of impact extruded articles of partly reduced cross-section i.e. specially profiled products which are composed of two or more portions of different thickness or diameter which adjoin one another in the axial direction.

Such a tool arrangement conventionally comprises a die and a punch arranged coaxially with respect to the die, both the die and the punch each comprising an axial central bore and a controlled ejector arranged in each bore, and the die and/or punch being adapted to carry out a relative reciprocating movement along their joint axis.

In hitherto known tool arrangements of this kind, the punch has a flat or elevated end face portion and pushes the slug into the die bore, which is provided with one or more constrictions. The ejection of the extruded product must necessarily be effected from the die side, the ejector at the die side pressing against the end face of the narrowed portion of the extruded product and having to overcome, in the ejection operation, both the frictional forces occurring at the wall of the relatively thick portion of the product and also the frictional forces occurring in the constriction. Owing to this relatively high frictional resistance, the relatively thin shank portion of the extruded product is often deformed during ejection. Also, the relatively thin ejector pin is subjected in the process to a high buckling stress which, it is found, can easily result in destruction of the pin.

The tool arrangement forming the subject of the present invention comprises a die member having an axial bore therein; a first ejector arranged in the bore in the die member and normally retracted from the end face thereof to form a first blind cavity, said first ejector being reciprocable in said bore in said die member to a location at least flush with said die member end face; a punch member having an axial bore therein axially aligned with the bore in the die member; a second ejector arranged in the bore in the punch member and normally retracted from the end face thereof to form a second blind cavity, said second ejector being reciprocable in said bore in said punch member to a location at least flush with the punch member end face, said die member and punch member being relatively axially reciprocable to a location in which their end faces are in abutting relationship; and yieldable pressure means urging said punch member towards said die member when said end faces are in abutting relationship.

With such a construction of the impact extrusion tools, the extruded product is ejected both at the die side and at the punch side, and the wall friction corresponding to the relatively thick portion of the extruded product is overcome by the more strongly dimensioned ejector, the risk of undesired deformation of the relatively thin product portions being as good as excluded.

In order that the invention may more readily be understood, the following description is given, merely by way of example reference being made to the accompanying drawings wherein.

Figure 1:
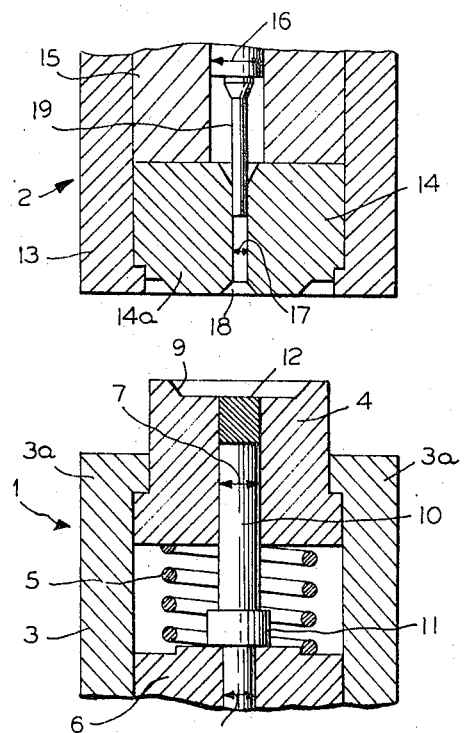
FIG. 1 is a schematic sectional view through one embodiment of tool arrangement according to the invention shortly after the insertion of the slug.

The tool arrangement shown diagrammatically in FIG. 1 comprises a reciprocable punch member 1 and a stationary die member 2. The punch 1 has a punch body 3 constructed substantially in the form of a hollow cylinder, which at its end face nearest to the die 2 comprises a radially inwardly directed flange 3a. This flange serves as an abutment for a step on a cylindrical punch head 4 which is axially slidable in the bore of the punch body 3 and which is pressed against the flange 3a by a coil spring 5, the other end of which bears on an insert 6 arranged immovably in the bore of the punch body 3.

In the punch head 4 is formed a central axial bore 7, which is in alignment with a central axial bore 8 situated in the insert 6 and at the die side opens into a tapered circular cross-section recess 9. In the two central bores 7 and 8 is guided an ejector 10 which is controlled by a driving mechanism in dependence on the working movement of the punch 1. A flange 11 determines the movement of the ejector 10 relatively to the insert 6 and the punch head 4. The end portion of the central bore 7 and the ejector 10 define a blind cavity to accommodate the slug 12 which is to be deformed.

Coaxially opposite the punch 1 is the die 2, which comprises a die housing 13 which is also constructed substantially as a hollow cylinder and in which is arranged a die head 14 provided with a central tapered centering projection 14a adjacent its end face, and is held in position by a sleeve 15. The projection 14a is machined very precisely to conform to the dimensions of the recess 9 in the punch, so that when punch and die engage one another, precise centering is guaranteed. Formed in the sleeve 15 is a central bore 16 which is in alignment with a central bore 17 in the die head 14, the bore 17 widening at the punch side into a tapering flow passage 18. Guided in the bores 16 and 17 is an ejector 19 which is moved by a driving mechanism in dependence on the working movement of the punch 1.

The punch 1 is coupled to a driving mechanism, for example a crank drive, and carries out a reciprocating movement, and the two ejectors 10 and 19 can be controlled e.g. by cam discs which themselves are also coupled to the driving shaft of the crank drive, so that the ejector movements which are derived from these cam discs are perfectly synchronised with the working movements of the impact extrusion punch. These driving and control elements are conventional and have not been illustrated in the drawings.

Figure 2:
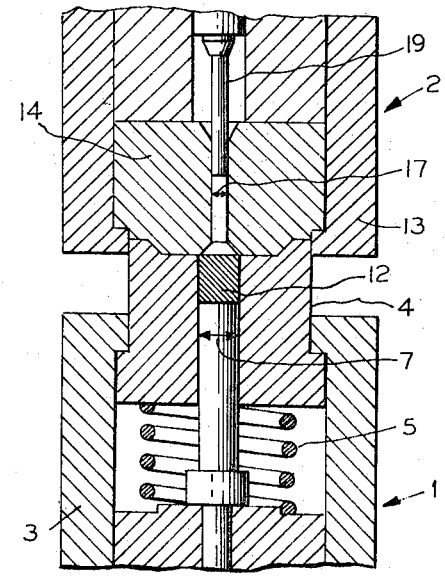
FIG. 2 is a similar view shortly after the punch and die have come together, but before the beginning of deformation.
Figure 3:
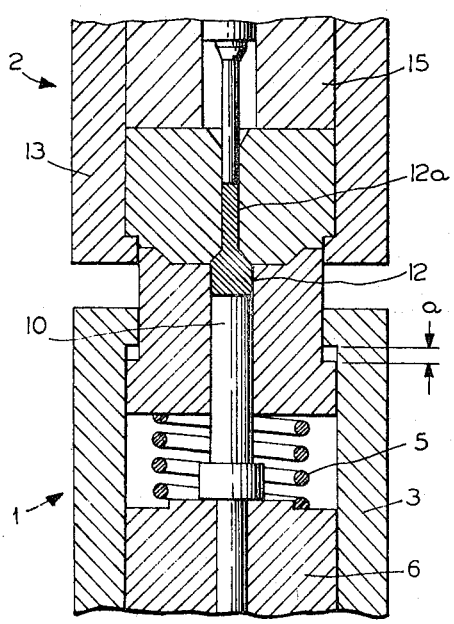
FIG. 3 is a similar view at the end of the deformation operation.
Figure 4:
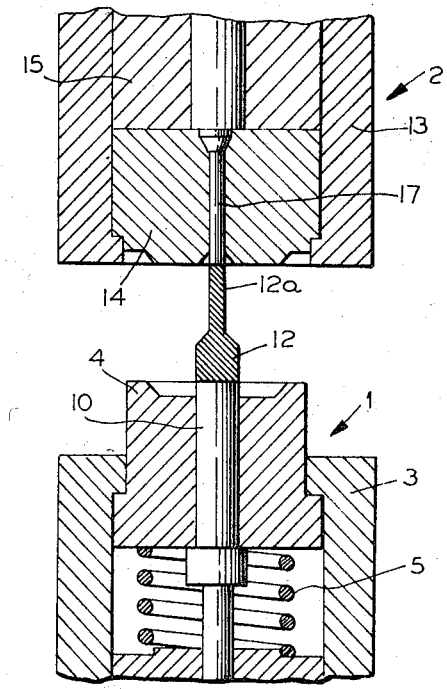
FIG. 4 is a similar view after the ejection of the extruded article.

In operation, the slug 12, which is to be brought to the shape shown in FIGS. 3 and 4, is situated in the initial position shown in FIG. 1 in the bore in the punch head 4. FIG. 2 shows the tool arrangement in a second position, in which the die 2, including the ejector 19, has retained its original position whereas the punch has been advanced towards the die by the crank gear. When the punch engages the end face of the die, the projection 14a enters the recess 9, so that the punch is centered very precisely in relation to the die. The ejector 10 has been advanced simultaneously with the punch 1 to the same extent, by means of the flange 11 resting on the insert 6.

After the position shown in FIG. 2 has been reached, the punch continues its advancing movement, and the punch head 4, overcoming the opposing force of the spring 5, carries out a relative movement with respect to the punch body 3, until it reaches its end position after the compression of the spring (FIG. 3). Simultaneously with the punch body 3, the ejector 10 is also moved forwards, pushing the slug partly into the opposite bore in the stationary die 2 and subjecting it to deformation. The slug which, as shown in FIG. 2, is enclosed on all sides except for its upper end face, can only yield into the bore of the die head 14 and is pressed by way of the tapering flow passage 18 into the bore 17 and thus forms the desired relatively thin shank portion 12a (FIG. 3), whereas the other portion, whose thickness remained unaltered, remains in the bore in the punch head.

During movement from the position shown in FIG. 2 to that shown in FIG. 3, the punch 1 is moved with the ejector 10 towards the die 2, whereas at the same time the punch head 4 carries out an axial displacement relatively to the punch housing 3 by the amount of the distance a (FIG. 3). The ejector 19 is still situated in its original position shown in FIGS. 1 and 2.

After deformation, the extruded article 12 must then be ejected. For this purpose, the punch 1 is removed from the die 2 in its return travel, whereas the ejector 10 under the influence of its cam disc carries out a somewhat slower return movement, so that in the transition from FIG. 3 to FIG. 4 it carries out a relative movement with respect to the punch head 4 and ejects the extruded article 12 from the bore of the punch head. At the same time the ejector 19 has also been moved towards the punch under the action of the cam disc associated with it, and ejected the article from the bore in the die head 14. Since the die-side ejector 19 has to overcome only the friction occurring at the wall of the relatively thin shank portion 12a, and the shank portion 12a is also closely guided on all sides at ejection, deformation at the time of ejection is extremely unlikely.

As FIG. 4 shows, the flange 11 of the ejector 10 in this end position bears on the inner end face of the punch head 4. To change over to the initial position shown in FIG. 1 again, the ejector 10 can be under the influence of a tension spring (not shown), which draws the flange 11 against the insert 6 as soon as the cam disc of the ejector permits this. The entire punch is at the same time returned to its initial position by its crank drive, whereupon a further slug can be inserted and deformed.

In the tool arrangement described above the die 2 has been assumed to be stationary, only the punch 1 reciprocating. However, it would readily be possible for the die 2 to be connected to the driving mechanism and for the punch 1 to be stationary. It may also be desirable to have both tools 1 and 2 moving simultaneously, since this can provide considerable load relief for the machine frame.

With the arrangement described, the extruded article can be ejected either first of all from the die or first of all from the punch, or simultaneously from both.

The apparatus described operates most satisfactorily, if the end faces of punch and die which contact one another are made to match one another with great precision, thus obviating the formation of any flash in the impact extrusion process. The satisfactory forward flow of the material is also facilitated by the fact that the entire working cycle described hereinbefore takes place within a fraction of a second, and the deforming material shoots into the die bore at a high speed.

The tapering flow passage 18 of the die bore is to merge with the greatest precision into the punch bore 7 serving to accommodate the slug.

The projection 14a used for centering the punch 1 and die 2 relatively to one another could also quite well be arranged on the punch, in which case the recess 9 would be provided at the die side.

The coil spring 5 can, of course, be replaced by any other restoring means, for example a hydraulic device operating in the manner of a shock absorber.

I claim:

1. A tool arrangement for the production of an article of differing cross-section by impact extrusion comprising a die member having an axial bore, an end face on said die member, a first ejector arranged in said bore in said die member and normally retracted from said end face to define with said bore a first blind cavity; said first ejector being reciprocable in said bore to a location at least flush with said end face of said die member; a punch member cooperating with said die member having an axial bore coaxial with said bore in said die member; an end face on said punch member, said die member and punch member being relatively axially reciprocable to a location in which their end faces are in abutting relationship; a second ejector arranged in said bore in said punch member normally retracted from said punch member end face to define a second blind cavity, said second ejector being reciprocable in said bore to a location at least flush with said end face of said punch member; and yieldable pressure means effective to urge said punch member towards said die member when said end faces are in abutting relationship whereby upon operation of said punch member upon a slug said slug is extruded partly into said die and said first and second ejectors cooperate to eject and hold the formed article between them while they are at a location substantially flush with the end face of the die member and the punch member respectively.

2. A tool arrangement as claimed in claim 1, wherein said bore in said punch member is of larger diameter than said bore in said die member.

3. A tool arrangement as claimed in claim 1, wherein said punch member comprises a punch body and an axially slidable punch head located in said body and wherein said yieldable pressure means comprises a compression spring.

4. A tool arrangement as claimed in claim 1, and further comprising a tapered recess adjacent the end face of one member and a tapered projection adjacent the end face of the other member effective accurately to align said punch member and die member as said end faces engage one another.

References Cited

UNITED STATES PATENTS

| | | | |
|---|---|---|---|
| 3,247,533 | 4/1966 | Phipard | 10—27X |
| 1,644,021 | 10/1927 | Knudsen | 10—27X |
| 3,417,597 | 12/1968 | Napoli | 72—256X |
| 3,143,007 | 8/1964 | Thompson | 72—257 |
| 1,900,572 | 3/1933 | Lyman | 10—12.5 |

FOREIGN PATENTS

| | | |
|---|---|---|
| 704,404 | 2/1954 | Great Britain. |
| 311,883 | 12/1955 | Switzerland. |

RICHARD J. HERBST, Primary Examiner

A. L. HAVIS, Assistant Examiner

U.S. Cl. X.R.

10—27; 72—260